(12) United States Patent
Venkatachalam et al.

(10) Patent No.: US 8,475,959 B2
(45) Date of Patent: Jul. 2, 2013

(54) LITHIUM DOPED CATHODE MATERIAL

(75) Inventors: Subramanian Venkatachalam, Pleasanton, CA (US); Deepak Kumaar Kandasamy Karthikeyan, Foster City, CA (US); Shabab Amiruddin, Fremont, CA (US); Herman A. Lopez, Sunnyvale, CA (US)

(73) Assignee: Envia Systems, Inc., Newark, CA (US)

( * ) Notice: Subject to any disclaimer, the term of this patent is extended or adjusted under 35 U.S.C. 154(b) by 338 days.

(21) Appl. No.: 12/870,295

(22) Filed: Aug. 27, 2010

(65) Prior Publication Data

US 2011/0052989 A1 Mar. 3, 2011

Related U.S. Application Data

(60) Provisional application No. 61/237,344, filed on Aug. 27, 2009.

(51) Int. Cl.
  *H01M 4/52* (2010.01)

(52) U.S. Cl.
  USPC .......................................... 429/221; 429/223

(58) Field of Classification Search
  USPC ................................. 429/221, 223
  See application file for complete search history.

(56) References Cited

U.S. PATENT DOCUMENTS

| | | |
|---|---|---|
| 5,658,693 A | 8/1997 | Thackeray et al. |
| 5,674,645 A | 10/1997 | Amatucci et al. |
| 6,037,095 A | 3/2000 | Miyasaka |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,372,385 B1 | 4/2002 | Kweon et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,749,648 B1 | 6/2004 | Kumar et al. |
| 6,872,491 B2 | 3/2005 | Kanai et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,205,072 B2 | 4/2007 | Kang et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,517,613 B2 | 4/2009 | Yuasa et al. |
| 7,674,557 B2 | 3/2010 | Sun et al. |
| 7,927,506 B2 | 4/2011 | Park |
| 7,935,270 B2 | 5/2011 | Park |
| 2002/0055042 A1 | 5/2002 | Kweon et al. |
| 2002/0114995 A1 | 8/2002 | Thackeray et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1 | 5/2004 | Kang et al. |
| 2005/0031942 A1 | 2/2005 | Hennige et al. |
| 2005/0202316 A1 | 9/2005 | Hwang et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0202405 A1 | 8/2007 | Shizuka et al. |
| 2007/0292757 A1 | 12/2007 | Watanabe et al. |

(Continued)

FOREIGN PATENT DOCUMENTS

| | | |
|---|---|---|
| EP | 2264814 A1 | 12/2010 |
| JP | 57046567 A2 | 4/1982 |

(Continued)

OTHER PUBLICATIONS

Boulineau et al., "Reinvestigation of Li2MnO3 Structure: Electron Diffraction and High Resolution TEM," Chem. Mater. 2009, 21, 4216-4222.

Hong et al., "Structural evolution of layered Li1.2Ni0.2Mn0.6O2 upon electrochemical cycling in a Li rechargeable battery," J. Mater. Chem., 2010, 20, 10179-10186.

Johnson et al., "Lithium-manganese oxide electrodes with layered-spinel composite structures xLi2MnO3 · (1-x)Li1 +yMn2-yO4 (0<x<1, 0≦y≦0.33) for lithium batteries," Electrochemistry Communications 7 (2005) 528-536.

Kang et al., "The Effects of Acid Treatment on the Electrochemical Properties of 0.5 Li2MnO3·0.5 LiNi0.44Co0.25Mn0.31O2 Electrodes in Lithium Cells," Journal of the Electrochemical Society 153(6):A1186-A1192 (2006).

(Continued)

*Primary Examiner* — Stuart Hendrickson
(74) *Attorney, Agent, or Firm* — Dardi & Herbert, PLLC; Peter S. Dardi

(57) ABSTRACT

Lithium dopant is introduced into lithium rich high capacity positive electrode active materials as a substitution for manganese within the complex metal oxides. In some embodiments, the lithium doped compositions can be written in a two component notation as x.Li$_2$MnO$_3$.(1−x)LiNi$_{u+\Delta}$Mn$_{u-\Delta-d}$Li$_d$Co$_w$O$_2$, where d ranges from about 0.004 to about 0.25 and 2u+w is approximately equal to 1. The materials are believed to form a layer-layer composite crystal structure that has very good cycling properties at high voltages, although the materials exhibit significant first cycle irreversible capacity loss.

8 Claims, 8 Drawing Sheets

U.S. PATENT DOCUMENTS

| | | | |
|---|---|---|---|
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0087362 A1 | 4/2009 | Sun et al. |
| 2009/0155694 A1 | 6/2009 | Park |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |

FOREIGN PATENT DOCUMENTS

| | | |
|---|---|---|
| JP | 06-243871 | 9/1994 |
| JP | 09-045373 | 2/1997 |
| JP | 10-255837 | 9/1998 |
| JP | 3112138 | 9/2000 |
| JP | 2002-110167 | 4/2002 |
| JP | 3506397 | 12/2003 |
| JP | 2006-134816 | 5/2006 |
| JP | 2006-344425 | 12/2006 |
| JP | 2007-220630 | 8/2007 |
| JP | 3276451 | 2/2008 |
| JP | 2008-536285 A | 9/2008 |
| JP | 2008258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 B1 | 4/2008 |
| KR | 10-2008-0099132 A | 11/2008 |
| KR | 10-2009-0078128 A | 7/2009 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |

OTHER PUBLICATIONS

Park et al., "Physical and electrochemical properties of spherical Li1+x(Ni1/3Co1/3Mn1/3)1-xO2 cathode materials", Journal of Power Sources, 177:177-183 (2008).

Robertson et al., "Mechanism of Electrochemical Activity in Li2MnO3," Chem. Mater. 2003, 15, 1984-1992.

Yabuuchi et al., "Detailed Studies of a High-Capacity Electrode Material for Rechargeable Batteries, Li2MnO3-LiCo1/3Ni1/3Mn1/3O2," J. Am. Chem. Soc. 2011, 133, 4404-4419.

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

Aurbach et al., "On the capacity fading of LiCoO2 intercalation electrodes: the effect of cycling, storage, temperature, and surface film forming additives," Electrochimica Acta 47 (2002) 4291-4306.

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters , 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina drived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Fey et al., "Saturated linear dicarboxylic acids as chelating agents for the sol-gel synthesis of LiNi0.8Co0.2O2," Materials Chemistry and Physics 87 (2004) 246-255.

Ho et al., "Application of A-C Techniques to the Study of Lithium Diffusion in Tungsten Trioxide Thin Films," J. Electrochem. Soc., 1980; 127(2):343-350.

Hwang et al. "Influence of Mn content on the morphology and electrochemical performance of LiNi1-x-yCoxMnyO2 cathode materials," J. Mater. Chem., 2003; 13:1962-1968.

Ito et al., "The relationship between crystal structure and the electrochemical reaction of Li-rich insertion materials (2)" 2010.

Johnson et al. "The significance of the Li2MnO3 component in 'composite' xLi2MnO3 • (1-x)LiMn0.5Ni0.5O2 electrodes," Electrochemistry Communications 6 (2004) 1085-1091.

Kang et al., "Enchancing the rate capability of high capacity xLi2Mn03 ·(1-x)LiMO2 (M=Mn, Ni, Co) electrodes by Li-Ni-PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).

Kim et al., "Electrochemical and Structural Properties of xLi2M'O3•(1-x)LiMn0.5Ni0.5O2 Electrodes for Lithium Batteries (M' = Ti, Mn, Zr; 0 ≦ x ≦0.3)" Chem. Mater. 2004, 16, 1996-2006.

Kim et al., "Electrochemical Stability of Thin-Film LiCoO2 Cathodes by Aluminum-Oxide Coating," Chem. Mater. 2003, 15(7):1505-1511.

Lee et al., "High capacity Li[Li0.2Ni0.2Mn0.6]O2 cathode materials via a carbonate co-precipitation method," J. of Power Sources, 162 (2006), 1346-1350.

Lee et al., "Electrochemical characteristics of Al2O3-coated lithium manganese spinel as a cathode material for a lithium secondary battery," J. of Power Sources 126 (2004) 150-155.

Luo et al., "On the incorporation of fluorine into the manganese spinel cathode lattice," Solid State Ionics 180 (2009) 703-707.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010.

Park et al., "Lithium-manganese-nickel-oxide electrodes with integrated layered-spinel structures for lithium batteries," Electrochemistry Communications 9 (2007) 262-268.

Quantachrome Corporation, Brochure for Quantachrome Instruments AUTOTAP device (2007).

Song et al., "Two- and three-electrode impedance spectroscopy of lithium-ion batteries," J. of Power Sources, 2002; 111:255-267.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "The preparation and electrochemical performance of solid solutions LiCoO2-Li2MnO3 as cathode materials for lithium ion batteries," J of Power Sources 159 (2006) 1353-1359.

Sun et al., "Significant Improvement of high voltage cycling behavior AlF3-coated LiCoO2 cathode," Electrochemistry Communications 8 (2006) 821-826.

Thackeray et al., "Li2MnO3-stabilized LiMO2 (M = Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Thackeray et al., "Advances in manganese-oxide 'composite' electrodes for lithium-ion batteries," J. Mater. Chem., 2005, 15, 2257-2267.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Yabuuchi et al., "Study of LiMnO3-Li(Co1/3Ni1/3Mn1/3)O2 for High Capacity Positive Electrode Material: II. Redox Reaction at the Positive Electrode/Electrolyte Interface," 2010.

Yoshii et al., "Study of LiMnO3-Li(Co1/3Ni1/3Mn1/3)O2 for High Capacity Positive Electrode Material: I. Change in the Crystal and Electronic Structure upon Li de-intercalation," 2010.

Zheng et al., "The Effects of AlF3 Coating on the Performance of Li[Li0.2Mn0.54Ni0.13Co0.13]O2 Positive Electrode Material for Lithium-Ion Battery," Journal of Electrochemical Society, 155 (10)A775-A782 (2008).

Thackeray et al., "Advances in manganese-oxide 'composite' electrodes for lithium-ion batteries," J. Mater. Chem., 2005,15, 2257-2267.

Ito et al., "Cyclic deterioration and it's improvement for Li-rich layered cathode material Li [Ni0.17Li0.2Co0.07Mn0.56]O2," Journal of Power Sources, 195: 567-573 (2010).

Ito et al., "A new approach to improve the high-voltage cyclic performance of Li-rich layered cathode material by electrochemical pretreatment," Journal of Power Sources 183: 344-346 (2008).

Shin et al., "Improvement of electrochemical properties of Li[Ni0.4Co0.2Mn(0.4-x)]O2-yFy cathode materials at high voltage region", Electrochimica Acta 52 1477-1482 (2006).

US 8,475,959 B2

LITHIUM DOPED CATHODE MATERIAL

CROSS REFERENCE TO RELATED APPLICATIONS

This application claims priority to U.S. provisional patent application Ser. No. 61/237,344 filed on Aug. 27, 2009 to Venkatachalam et al., entitled "Cathode Compositions for Lithium Ion Batteries", incorporated herein by reference.

FIELD OF THE INVENTION

The inventions, in general, are related to lithium rich metal oxides having an additional lithium dopant relative to a reference composition. The inventions are further related to methods for the formation of lithium doped lithium rich metal oxides.

BACKGROUND

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only roughly 50% of the theoretical capacity of the cathode can be used, e.g., roughly 140 mAh/g. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries can be classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a positive electrode active material for a lithium ion battery comprising a layered lithium metal oxide approximately represented by the formula x $Li_2MnO_3 \cdot (1-x)LiNi_{u+\Delta}Mn_{u-\Delta-d}Li_dCo_wA_yO_2$, x ranges from about 0.03 to about 0.55, d ranges from about 0.004 to about 0.25, 2u+w+y is approximately equal to 1, $\Delta$ ranges from about −0.3 to about 0.3, w ranges from 0 to 1, u ranges from 0 to about 0.5 with the proviso that both (u+$\Delta$) and w are not both 0, y ranges from 0 to about 0.1, and A is Mg, Sr, Ba, Cd, Zn, Al, Ga, B, Zr, Ti, Ca, Ce, Y, Nb, Cr, Fe, V, or combinations thereof, wherein an optional fluorine dopant can replace no more than about 10 mole percent of the oxygen.

In another aspect, the invention pertains to a method for forming a lithium doped, lithium rich metal oxide composition, the method comprising precipitating a metal precursor compound and calcining at a first temperature a mixture of lithium carbonate and the precursor metal compound to form the lithium doped, lithium rich metal oxide composition. The metal precursor compound can comprise a selected amount of lithium dopant and transition metal elements in selected amounts.

In a further aspect, the invention pertains to a method for forming a lithium doped, lithium rich metal oxide composition, the method comprising heating a blend of lithium carbonate with a lithium rich metal oxide to form a doped composition. The lithium carbonate can be in an amount to provide lithium element at a selected dopant stoichiometry.

DETAILED DESCRIPTION OF PREFERRED EMBODIMENTS

Figure 1:
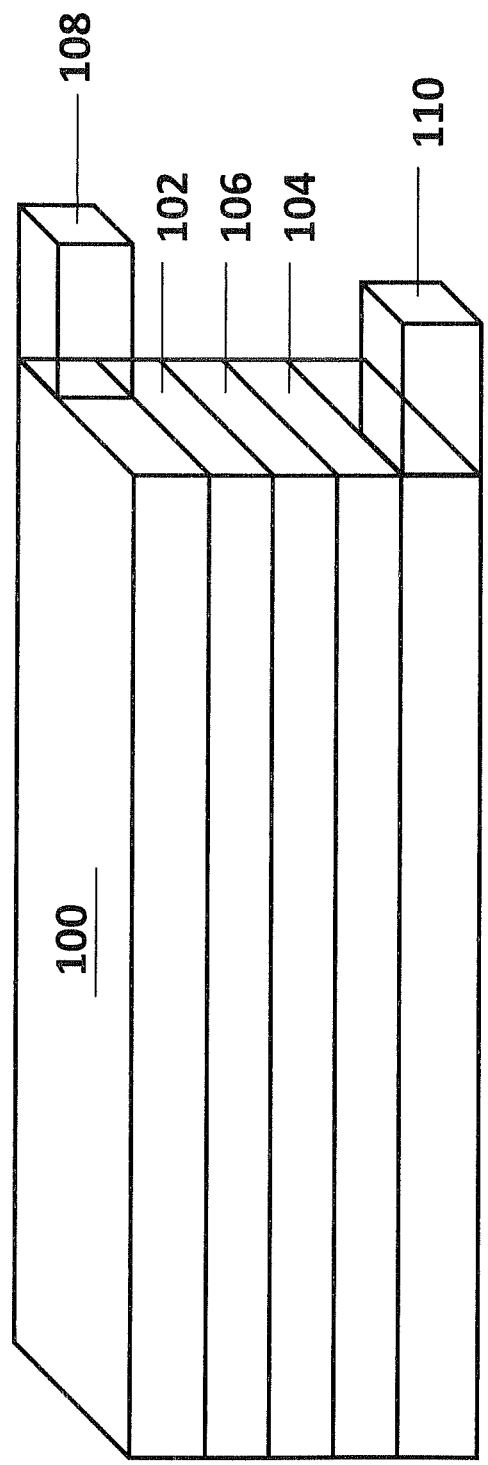
FIG. 1 is a schematic drawing of a battery structure separated from a container.

Lithium rich metal oxides can be used as active materials in positive electrodes for lithium ion batteries, and the compositions have been found to provide a high specific capacity during cycling at relatively low and high rates of charging and discharging. As described herein, lithium doping is introduced to stabilize the structure of the composition. Thus, it is believed that lithium is introduced for incorporation into the lattice as a substitute for a transition metal, specifically manganese, such that lithium within the initial material includes both lithium in lattice sites that are removable during battery charging, and further lithium at stable sites that are not readily removable with cycling. Doping can be used as an approach to improve stability of the material with cycling. During cycling in a lithium-based battery, lithium metal oxides undergo significant structural changes as a result of extraction and re-intercalation of lithium out from and into the lattice of the material as the battery is cycled. As long as the structural changes are essentially reversible, the battery can stably cycle for many cycles. To the extent that materials undergo irreversible structural changes, the battery can experience fade, i.e., a loss of capacity. After a larger number of cycles the battery can fail, and generally the battery is replaced after a selected degree of fading. If the crystal structure can be stabilized during cycling, the practical lifetime of the battery can be longer, and the cost of use of the battery can be correspondingly reduced. As described herein, an approach for stabilizing the metal lattice involves the doping of the composition with lithium for incorporation into the lattice at non-extractable sites in the lattice. Appropriate methods are described for introduction of the lithium. Coatings can further improve the performance of these positive electrode active compositions.

The lithium ion batteries can use a positive electrode active material that is lithium rich relative to a reference homogenous electroactive lithium metal oxide composition, specifically $LiMO_2$ where M represents one or more non-lithium metal elements. In compositions of particular interest, composition that can be approximately represented by $Li_{1+b}Ni_\alpha Mn_{\beta-\epsilon}Li_\epsilon Co_\gamma A_\delta O_{2-z}F_z$, where A is an optional non-lithium metal dopant and F is an optional fluorine dopant. If $b+\alpha+\beta+\gamma+\delta\approx 1$, the composition can be approximately represented by the formula $x\ Li_2MnO_3\cdot(1-x)LiMO_2$, where M is mixture of metals with an average valance of +3 generally comprising Mn and a Li dopant as well as Ni and/or Co, optionally with another dopant metal, and where $0<x<1$. In appropriate embodiments, the two crystalline materials represented by the two component notation are believed to be integrated within a layer-layer super lattice structure. The general class of compositions are entitled "Lithium Metal Oxide Electrodes for Lithium Cells and Batteries," incorporated herein by reference.

In addition to fade resulting from extended cycling, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell. The irreversible capacity lose generally can be attributed to changes during the initial charge-discharge cycle of the battery materials that may be substantially maintained during subsequent cycling of the battery.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Unless indicated otherwise, performance values referenced herein are at room temperature.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

As noted above, the class of positive electrode active materials of interest can be approximately represented with a formula:

$$Li_{1+b}Ni_\alpha Mn_{\beta-\epsilon}Li_\epsilon Co_\gamma A_\delta O_{2-z}F_z, \qquad (1)$$

where b ranges from about 0.01 to about 0.3, α ranges from 0 to about 0.4, β range from about 0.20 to about 0.65, γ ranges from about 0 to about 0.46, δ ranges from about 0.001 to about 0.15, ε ranges from about 0.0025 to about 0.1, and z ranges from 0 to about 0.2 with the proviso that both α and γ are not zero, and where A is a metal different from Li, Ni, Mn and Co or a combination thereof. Element A and F (fluorine) are optional cation and anion dopants, respectively. Elements A can be, for example, Mg, Sr, Ba, Cd, Zn, Al, Ga, B, Zr, Ti, Ca, Ce, Y, Nb, Cr, Fe, V, or combinations thereof The use of a fluorine dopant in lithium rich metal oxides to achieve improved performance is described in copending U.S. patent application Ser. No. 12/569,606 to Kumar et al., entitled "Fluorine Doped Lithium Rich Metal Oxide Positive Electrode Battery Materials With High Specific Capacity and Corresponding Batteries," incorporated herein by reference.

Lithium rich active compositions have been described in U.S. application Ser. No. 12/246,814 (the '814 application) to Venkatachalam et al. entitled "Positive Electrode Material for Lithium Ion Batteries Having a High Specific Discharge Capacity and Processes for the Synthesis of these Materials", and U.S. application Ser. No. 12/332,735 (the '735 application) to Lopez et al. entitled "Positive Electrode Materials for High Discharge Capacity Lithium Ion Batteries", both incorporated herein by reference. As described in the '814 application and the '735 application, surprisingly good performances have been obtained for $Li[Li_{0.2}Ni_{0.175}Co_{0.10}Mn_{0.575}]O_2$ using a co-precipitation synthesis process.

The formulas presented herein are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The lithium rich compositions generally are found to undergo significant irreversible structural changes during the first charge cycle of the battery in which lithium is extracted from the active composition. The irreversible capacity losses may be associated with changes in crystal structure or other side reactions, such as the formation of molecular oxygen. Nevertheless, the lithium rich compositions are found to have significant increases in reversible specific capacity relative to the reference compositions that are not lithium rich, which makes these potentially important materials for battery applications. Generally, these lithium rich materials can operate at relatively high voltages.

Furthermore, the composite crystal structure provides greater stability with respect to cycling following the irreversible changes that take place during the first charge. Doping to replace some of the transition metals has been explored for providing further stabilization and improving the performance of the compositions in lithium ion battery applications. For example, some desirable results have been observed with respect to introduction of dopants with a +2 valance, such as $Mg^{+2}$. The use of +2 dopants for lithium rich compositions is described further in copending U.S. patent application Ser. No. 12/753,312 to Karthikeyan et al., entitled "Doped Positive Electrode Active Materials and Lithium Ion Secondary Battery Constructed Therefrom," incorporated herein by reference.

It has been found that the selection of the specific stoichiometry for the lithium rich metal oxide active composition can be selected to encourage specific oxidation states for the elements. Specifically, while Mn, Co and Ni have multiple accessible oxidation states, which directly relates to their use in the active material, in these composite materials if appropriate amounts of these elements are present, it is thought that the elements can have the oxidation states $Mn^{+4}$, $Co^{+3}$ and $Ni^{+2}$. Then, if $\delta=0$, the two component notation simplifies to $x.Li_2MnO_3.(1-x)LiNi_uMn_uCo_wO_2$, with $2u+w=1$. In some embodiments, the stoichiometric selection of the metal elements can be based on these presumed oxidation states.

Based on these reference compositions, desirable properties can be obtained with specific engineering of the positive electrode active composition. Also, the desired stoichiometry can be selected based on the selected properties for the material for a particular application. In particular, active compositions have been found with good performance properties with variations in composition around the reference ranges of compositions described in the previous paragraph. In particular, a range of compositions of interest can be described approximately by the formula $x.Li_2MnO_3.(1-x)LiNi_{u+\Delta}Mn_{u-\Delta}Co_wO_2$, with $2u+w=1$ and $-0.3 \leq \Delta \leq 0.3$. In some embodiments of particular interest, x ranges from 0.03 to about 0.47, although other ranges are of particular interest for particular performance properties. Furthermore, in some embodiments, u ranges from about 0.2 to about 0.4, and w ranges from about 0.2 to about 0.475. A person of ordinary skill in the art will recognize that additional composition ranges within the explicit ranges above are contemplated and are within the present disclosure.

As described herein, lithium, which have a valance of 1, is doped as a partial substitution for a portion of the manganese. Thus, the formula is replaced by $x.Li_2MnO_3.(1-x)LiNi_{u+\Delta}Mn_{u-\Delta-d}Li_dCo_wO_2$, where d ranges from about 0.004 to about 0.25. It is believe that the lithium dopant can substitute for the manganese at the manganese lattice sites. Thus, correspondingly the lithium dopant is not extractable with respect to cycling within a lithium based battery. As described in the examples, some promising results have been observed for the resulting materials with a portion of the manganese substituted with lithium.

Lithium stoichiometry in any positive electrode active material is very significant for a lithium-ion cell to exhibit a long cycle life with its characteristic capacities. Oxide positive electrode active materials can be heated to a relatively high temperature of ~800 to 900° C. for the formation of highly crystalline phase compound. Especially for the layer positive electrode materials with the $\alpha$-$NaFeO_2$ rock salt structure, ordering of the lattice sites are very important for the formation a material that supports the lithium intercalation/de-intercalation reactions. The ordering of lattice sites happens only at high temperatures where the crystallinity of the material is also high. In the present case, the cathode composition is a lithium rich composition where it is believed that some of the excess lithium is occupying the transition metal lattice sites.

The synthesis of the lithium rich active metal oxide compositions can be performed with a co-precipitation process. Specifically, carbonate and hydroxide co-precipitation processes have been performed for the lithium rich metal oxide materials. Generally, a solution is formed from which a metal hydroxide or metal carbonate is precipitated with the desired transition metal stoichiometry. The transition metal carbonate or metal hydroxide can be co-precipitated from a mixed metal salt aqueous solution using a $Na_2CO_3$/$NH_4OH$ as precipitating agent. A two step firing process can be employed for the formation of the lithium rich high capacity manganese rich cathode material. A first firing step can be done at a temperature from about 400° C. to about 700° C. for from about 5 h to about 15 h, where the basic decomposition of the precursor composition to the complex metal oxide occurs. A subsequent annealing step can be from about 800° C. to about 1000° C. for from about 8 h to about 24 h where the enhancement of crystallinity occurs.

In general, the lithium cations can either be incorporated into the initial co-precipitation process, or the lithium can be introduced in a solid state reaction during or following the heat treatment to form the oxide compositions from the hydroxide or carbonate compositions. In some embodiments, lithium carbonate is added as lithium source to a transition metal precursor. As described in the '735 application above, the co-precipitation processes can be adapted to provide lithium metal oxide powders with a relatively high tap density, which can be exploited with respect to improved performance for a specific battery volume.

Cathode materials with any small deviation in their composition during synthesis can result in a composition with inferior electrochemical performance which arises due to various factors such as cation mixing, structural instability because of columbic force of attraction between oxygen anions and the transition metal cations. The presence of Li in the selected stoichimetric ratio can be important for the maintenance of the structural integrity of the composition. In the case of the lithium rich positive electrode active compositions described herein, since excess Li can be present in the transition metal layer, the addition of more lithium should be appropriately controlled.

In general, the positive electrode active material is formed in a process comprising three reactive steps. A precursor metal composition, such as a metal hydroxide or metal carbonate, can be formed by co-precipitation from a solution comprising selected metal cations in desired ratios. The precursor composition can then be heat treated to decompose the precursor composition to form the corresponding metal oxide with the release of a gaseous or vapor compound that is removed from the system. Then, the as-formed complex metal oxide is heated at a higher temperature to improve the crystallinity of the complex metal oxide. The reactive, non-dopant, lithium can be added generally at any step in the process, but it has been found that the reactive lithium can be added effectively during the heat treatment to form the complex metal oxide from the precursor composition. As described herein, 4 different ways are described to incorporate the excess Li dopant.

First, the excess lithium dopant can be introduced to the lithium rich cathode composition during the general lithiation process. In other words, the excess Li dopant can be added along with the remaining quantities of lithium, e.g., as $Li_2CO_3$ or other suitable lithium compound that is combined with a $MCO_3$ and/or MOH precursor and fired at a suitable temperature and time.

In additional or alternative embodiments, the lithium dopant can be introduced during the co-precipitation step. In other words, the lithium can be introduced with the other metal elements, e.g., transition metal elements, during the formation of the precursor particles. The appropriate amount of lithium can be added based on the desired level of doping. The precursor particles with the lithium dopant are further processed to complete the formation of the highly crystalline active material.

In further embodiments, the dopant lithium element is added as a decomposable lithium precursor to the metal oxide particles immediately prior to the higher temperature heating step to improve the crystallinity of the complex metal oxide. The lithium dopant can be incorporated into the material during the heating to improve the crystallinity. Also, after the heating to form the highly crystalline active material, the dopant lithium can be introduced in a separate heating step. A decomposable lithium precursor composition can be mixed with the highly crystalline complex metal oxide, and the mixture is heated to introduce the lithium dopant into the material.

Inorganic coatings, which generally are believed to be inert with respect to battery cycling, can provide significant improvements for lithium rich layered-layered positive electrode active materials described herein. These improvements can relate to long term cycling with significantly reduced degradation of capacity, an improvement in the specific capacity and in some cases a significant decrease in first cycle irreversible capacity loss. The thickness of coating material can be selected to accentuate the observed performance improvements. Metal fluoride coatings designed for excellent performance with lithium rich metal oxides are described further in copending U.S. patent application Ser. No. 12/616,226 to Lopez et al., entitled "Coated Positive Electrode Materials for Lithium Ion Batteries," incorporated herein by reference. Also, metal oxides and metal phosphates have also been used as coatings for positive electrode active materials. Metal oxide coatings for use on lithium rich metal oxide active materials are described further in copending U.S. patent application Ser. No. 12/870,096, filed on the same day as the present application to Karthikeyan et al., entitled "Metal Oxide Coated Positive Electrode Materials For Lithium-Based Batteries," incorporated herein by reference.

It is useful to note that during charge/discharge measurements, the specific capacity of a material depends on the rate of discharge. The maximum specific capacity of a particular material is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33 C, and other charge and discharge rates can be written in this notation.

As seen in the examples below, the inclusion of a lithium dopant generally does not improve the specific capacity of the material at low cycling stages of the battery, although the lithium dopant in many embodiments does not significantly reduce the specific capacity relative to an undoped material. However, the results in the examples suggest that the use of a lithium dopant can lead to significantly improved specific capacity after 500 charge-discharge cycles. Therefore, lithium doping may prove to be useful to extend the lifetime of batteries with the lithium rich active compositions described herein. Specifically, in some embodiments, a lithium dopant can improve the specific capacity of the positive electrode active material at 600 cycles by at least about 10 percent, in further embodiments from about 12 percent to about 50 percent and in additional embodiments from about 15 percent to about 45 percent. A person of ordinary skill in the art will recognize that additional ranges of performance improvement within the explicit ranges above are contemplated and are within the present disclosure.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. The batteries described herein are suitable for vehicle applications. In particular, these batteries can be used in battery packs for hybrid vehicles, plug-in hybrid vehicles and purely electric vehicles. These vehicles generally have a battery pack that is selected to balance weight, volume and capacity. Thus, due to the high capacity of the batteries described herein, a battery pack that yields a desired amount of total power can be made in a reasonable volume, and these battery packs can correspondingly achieve the excellent cycling performance.

Positive Electrode Active Materials

The positive electrode active materials comprise lithium rich compositions that generally are believed to form a layer-layer composite crystal structure. In embodiments of particular interest, the lithium metal oxide compositions further comprise Ni, Co and Mn elements with a lithium dopant. The lithium dopant can be selected to replace part of the manganese in a reference composition. As noted above, the positive electrode composition can comprise an optional fluorine anion dopant. In some embodiments, it is desirable to provide an inert inorganic coating to further stabilize the materials. Coatings are described further in other sections below.

The positive electrode active materials of particular interest can be represented approximately in two component notation as $x\,Li_2MnO_3 \cdot (1-x)LiMO_2$, where M is two or more metal elements with an average valance of +3 and with one of the metal elements being Mn and with another metal element being Ni and/or Co. In general, $0<x<1$, but in some embodiments $0.03 \leq x \leq 0.55$, in further embodiments $0.075 \leq x \leq 0.50$, in additional embodiments $0.1 \leq x \leq 0.45$, and in other embodiments $0.15 \leq x \leq 0.425$. A person of ordinary skill in the art will recognize that additional ranges of the composition parameter x within the explicit ranges above are contemplated and are within the present disclosure. For example, M can be a combination of nickel, cobalt and manganese, which can be in oxidation states $N^{+2}$, $CO^{+3}$ and $Mn^{+4}$. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In general, M is a combination of manganese and a lithium dopant substituting for a portion of the manganese as well as nickel and/or cobalt, and optionally one or more additional dopant metals. Thus, M can be written as $Ni_u Mn_{v-d} Li_d Co_w A_y$. For embodiments in which y=0, this simplifies to $Ni_u Mn_{v-d} Li_d Co_w$. If M includes Ni, Co, Mn, Li and optionally A the composition can be written alternatively in two component notation and single component notation as the following.

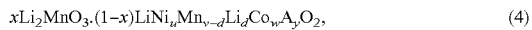

$$xLi_2MnO_3 \cdot (1-x)LiNi_uMn_{v-d}Li_dCo_wA_yO_2, \quad (4)$$

$$Li_{1+b}Ni_\alpha Mn_{\beta-\epsilon}Li_\epsilon Co_\gamma A_\delta O_2, \quad (5)$$

with $u+v+w+y \approx 1$ and $b+\alpha+\beta+\gamma+\delta \approx 1$. The reconciliation of these two formulas leads to the following relationships:

$$b=x/(2+x),$$

$$\alpha=2u(1-x)/(2+x),$$

$$\beta=2x/(2+x)+2v(1-x)/(2+x),$$

$$\gamma=2w(1-x)/(2+x),$$

$$\delta=2y(1-x)/(2+x),$$

$$\epsilon=2d/(1-x)/(2+x),$$

and similarly, $$x=2b/(1-b),$$

$$u=\alpha/(1-3b),$$

$$v=(\beta-2b)/(1-3b),$$

$$w=\gamma/(1-3b),$$

$$y=\delta/(1-3b),$$

$$d=\epsilon/(1-3b).$$

In some embodiments, it is desirable to have $u \approx v$, such that $LiNi_uMn_{v-d}Li_dCo_wA_yO_2$ becomes approximately $LiNi_uMn_{u-d}Li_dCo_wA_yO_2$. In this composition, when y=0, the average valance of Ni, Co and Mn is +3, and if $u \approx v$, then these elements can be believed to have valances of approximately $Ni^{+2}$, $Co^{+3}$ and $Mn^{+4}$, although the lithium dopant presumably alters the valances of the metals. A rough balance of Ni and Mn can provide for Mn to remain in a +4 valance as the material is cycled in the battery. If Mn remains in a +4 oxidation state, the metal balance avoids the formation of $Mn^{+3}$, which has been associated with dissolution of Mn into the electrolyte and a corresponding loss of capacity.

In a layer-layer structure, the $Li_2MnO_3$ component may give off molecular oxygen upon extraction of the lithium with the resulting formation of $MnO_2$, which then could cycle with $LiMnO_2$ upon recharging of the battery. In these materials, the resulting $Mn^{+3}$ seems to be relatively stable with respect to dissolution if $Mn^{+3}$ is formed from the $Li_2MnO_3$. Since the initial composition loses two lithium atoms with the generation of 2 electrons and since the product composition has only a single lithium atom to cycle with the exchange of a single electron, this composition change results in the irreversible capacity loss. Furthermore, evidence suggests more complex changes to the crystal structure during the first cycle formation step so that the amount of oxygen loss may not correspond to the stoichiometric amount of active $Li_2MnO_3$ based on the amount of metal incorporated into the composition. Also, coating of the composition with an inorganic coating material further influences this chemistry, as evidenced by a change in the specific capacity as well as the irreversible capacity loss. The underlying chemistry contributing to the excellent performance of these materials is not completely understood. The engineering of the particular metal stoichiometries to obtain desired battery performance is described further in copending U.S. patent application Ser. No. 12/869,976 filed on the same day as the present application to Lopez et al., entitled "Layer-Layer Lithium Rich Complex Metal Oxides With High Specific Capacity and Excellent Cycling," incorporated herein by reference.

With respect to the one component notation, the lithium rich metal oxide compositions of particular interest can be described by the formula $Li_{1+b}Ni_\alpha Mn_{\beta-\epsilon}Li_\epsilon Co_\gamma A_\delta O_2$, where b ranges from about 0.015 to about 0.19, α ranges from 0 to about 0.4, β ranges from about 0.25 to about 0.65, γ ranges from 0 to about 0.46, δ ranges from about 0 to about 0.1, ε ranges from about 0.0025 to about 0.1, with the proviso that both a and are not zero and where A is Mg, Sr, Ba, Cd, Zn, Al, Ga, B, Zr, Ti, Ca, Ce, Y, Nb, Cr, Fe, V, or combinations thereof. With respect to the Li dopant, in further embodiments ε ranges from about 0.005 to about 0.09 and in additional embodiments from about 0.0075 to about 0.08. A person of ordinary skill in the art will recognize that additional ranges of parameter values within the explicit ranges above are contemplated and are within the present disclosure.

With respect to some embodiments of materials described herein, Thackeray and coworkers have proposed a composite crystal structure for some lithium rich metal oxide compositions in which a $Li_2MO_3$ composition is structurally integrated into a layered structure with a $LiM'O_2$ component. Batteries formed from these materials have been observed to cycle at high voltages and with higher capacities relative to batteries formed with corresponding $LiMO^2$) compositions. These materials are described generally in U.S. Pat. No. 6,680,143 to Thackeray et al., entitled Lithium Metal Oxide Electrodes for Lithium Cells and Batteries," and U.S. Pat. No. 6,677,082 to Thackeray et al., entitled "Lithium Metal Oxide Electrodes for Lithium Cells and Batteries," both of which are incorporated herein by reference. Thackeray identified Mn, Ti, and Zr as being of particular interest as M' and Mn and Ni for M.

The structure of some specific layered structures is described further in Thackeray et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}]_{1-x}O_2$. The article also describes the structural complexity of the layered materials.

Recently, Kang and coworkers described a composition for use in secondary batteries with the formula $Li_{1+x}Ni_\alpha Mn_\beta Co_\gamma M'_\delta O_{2+z}F_z$, M'=Mg, Zn, Al, Ga, B, Zr, Ti, x between about 0 and 0.3, α between about 0.2 and 0.6, β between about 0.2 and 0.6, γ between about 0 and 0.3, δ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al. (the '072 patent), entitled "Layered cathode materials for lithium ion rechargeable batteries," incorporated herein by reference. The effects of fluorine doping for lithium rich and manganese rich lithium metal oxides is described further in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference.

The performance of the positive electrode active materials is influenced by many factors. In particular, it is believed that the compositions with $u \approx v$ in the formula above results in relatively stable cycling. This observation would be consistent with results observed in the '814 application and the '735 application, the compositions in the '814 application and the '735 application had stoichiometries somewhat varied from u≈v.

Based on these observations and the results in the examples below, the composition of particular interested can be represented approximately by the formula:

$$xLi_2MnO_3 \cdot (1-x)LiNi_{u+\Delta}Mn_{u-\Delta-d}Li_dCo_wA_yO_2, \quad (6)$$

where the absolute value of Δ generally is no more than about 0.3 (−0.3≦Δ≦0.3), in some embodiments no more than about 0.2 (−0.2≦Δ≦0.2), in other embodiments no more than about 0.175 (−0.175≦Δ≦0.175) and in further embodiments no more than about 0.15 (−0.15≦Δ≦0.15). Desirable ranges for x are given above. With 2u+w+y≈1, desirable ranges of parameters are in some embodiments 0≦w≦1, 0≦u≦0.5, 0≦y≦0.1, 0.004≦d≦0.25 (with the proviso that both u+Δ and w are not zero), in further embodiments, 0.1≦w≦0.6, 0.1≦u≦0.45, 0≦y≦0.075, 0.0075≦d≦0.175, and in additional embodiments 0.2≦w≦0.475, 0.2≦u≦0.4, 0≦y≦0.05, 0.01≦d≦0.125. A person of ordinary skill in the art will recognize that additional ranges of composition parameters within the explicit ranges above are contemplated and are within the present disclosure. As used herein, the notation (value1≦variable≦value2) implicitly assumes that value 1 and value 2 are approximate quantities.

Synthesis Methods

Synthesis approaches described herein can be used to form layer-layer lithium rich positive electrode active materials with high values of specific capacity and a relatively high tap density. The synthesis methods have been adapted for the synthesis of compositions with the formula $Li_{1+b}Ni_\alpha Mn_\beta Co_\gamma A_\delta O_2 F_z$ and the desired parameter ranges, as described above The synthesis approaches are also suitable for commercial scale up. Specifically, co-precipitation process can be used to synthesize the desired lithium rich positive electrode materials with desirable results. Overall, the process generally can be considered to comprise three major steps, the precipitation of a precursor composition, the thermal conversion of the precursor composition into an oxide and a higher temperature step to improve the crystallinity of the material. The lithium dopant can be incorporated into the process at one of several steps. The lithium dopant element may or may not be introduced at the same time as the remaining quantities of reactive lithium. Alternatively or additionally, the lithium dopant can be incorporated into the material at a separate heating step after performing the heating step to improve the crystallinity of the positive electrode active material.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the optional dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. A fluoride, such as $MgF_2$, can be added to introduce a fluoride dopant. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. In particular, the larger amount of lithium even if there is a lithium dopant is the extractable lithium that is reactive during cycling. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH \cdot H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material. Further details of the hydroxide co-precipitation process are described in the '814 application referenced above. Further details of the carbonate co-precipitation process are described in the '735 application referenced above.

As noted above, the reactive, e.g., lithium extractable during battery charging, may or may not be introduced into the composition at the same stage of the processing as the lithium dopant. The lithium dopant can be added at least in any one of four steps in the process. For example, the lithium dopant can be added as an initially soluble lithium salt during the co-precipitation step such that the lithium dopant is included in the precipitated precursor powder. Alternative, the lithium dopant element can be added as a lithium carbonate to the precursor powder that is then heated to form the complex metal oxides. Similarly, the lithium dopant can be added after the formation of the complex metal oxide through the addition of lithium carbonate to the complex metal oxide prior to the initiation of the calcination step to improve the crystallinity of the active material.

Also, the lithium dopant can be added in a separate heat treatment step after the calcination step to improve the crystallinity of the material. Thus, the overall processing for the positive electrode active material would include an extra step that is not used for the undoped material. To perform this dopant step, the appropriate stoichiometric amount of lithium carbonate to provide the desired degree of doping is mixed with the highly crystalline complex metal oxide. The powder mixture is then heated to a temperature from about 450° C. to about 1100° C., in further embodiments from about 500° C. to about 1050° C. and in additional embodiments from about 550° C. to about 1000° C. The dopant incorporation happens during the heating step, which can be performed in some embodiments for from about 1 hr to about 24 hrs, in further embodiments from about 1.5 hrs to about 18 hrs and in additional embodiments from about 2 hrs to about 15 hrs. A person of ordinary skill in the art will recognize that additional ranges within the specific ranges above are contemplated and are within the present disclosure.

Coatings and Methods for Forming the Coatings

Inorganic coatings, such as metal fluoride coatings and metal oxide coatings, have been found to significantly improve the performance of the lithium rich layered positive electrode active materials, although the coatings are believed to be inert with respect to battery cycling. In particular, the cycling properties of the batteries formed from metal fluoride coated lithium metal oxide have been found to significantly improve from the uncoated material, although inert metal oxide coatings and metal phosphate coatings have also been found to yield desirable properties. Additionally, the specific capacity of the batteries also shows desirable properties with the coatings, and the irreversible capacity loss of the first cycle of the battery can be reduced with some coatings. As discussed above, first cycle irreversible capacity loss of a battery is the difference between the charge capacity of the new battery and its first discharge capacity. For the batteries described herein, a significant portion of the first cycle irreversible capacity loss is generally attributed to the positive electrode material.

With respect to metal oxide and metal fluoride coatings, a coating with a combination of metal and/or metalloid elements can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium ion secondary batteries. See, for example, the '814 application and the '735 application cited above, as well as copending U.S. patent application Ser. No. 12/616,226 to Lopez et al., entitled "Coated Positive Electrode Materials for Lithium Ion Batteries," which is incorporated herein by reference.

An increase in capacity and a reduction in irreversible capacity loss were noted with $Al_2O_3$ coatings by Wu et al., "High Capacity, Surface-Modified Layered Li[Li$_{(1-x)/3}$Mn$_{(2-x)/3}$Ni$_{x/3}$Co$_{x/3}$]O$_2$ Cathodes with Low Irreversible Capacity Loss," Electrochemical and Solid State Letters, 9 (5) A221-A224 (2006), incorporated herein by reference. The use of a $LiNiPO_4$ coating to obtain improved cycling performance is described in an article to Kang et al "Enhancing the rate capability of high capacity xLi$_2$MnO$_3$ (1-x)LiMO$_2$ (M=Mn, Ni, Co) electrodes by Li—Ni—PO$_4$ treatment," Electrochemistry Communications 11, 748-751 (2009), incorporated herein by reference, and this article can be referenced generally with respect to the formation of metal phosphate coatings. Metal oxide coatings for lithium rich materials are described further in copending U.S. patent application filed on the same date as the present application to Karthikeyan et al., entitled "Metal Oxide Coated Positive Electrode Materials for Lithium Ion Batteries," incorporated herein by reference.

In some embodiments, the coating can improve the specific capacity of the batteries even though the coating itself is not electrochemically active. However, the coatings can also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. Further discussion of the effects on the performance properties for coated lithium rich lithium metal oxides is found in copending U.S. patent application Ser. No. 12/616,226 to Lopez et al., entitled "Coated Positive Electrode Materials for Lithium Ion Batteries," incorporated herein by reference.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydorxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation, alloying or similar mechanisms. Desirable mixed metal oxides are described further herein to function as electroactive materials for positive electrodes in secondary lithium-based batteries, such as lithium ion batteries. Lithium ion batteries refer to batteries in which the negative electrode active material is a material that takes up lithium during charging and releases lithium during discharging. If elemental lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5 \leq x \leq 1$ or $Li_{1+x}Ti_{2-x}O_4$, $0 \leq x \leq 1/3$. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference.

The positive electrode active compositions and negative electrode active compositions generally are powders that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure. In some embodiments, the batteries can be constructed based on the method described in published U.S. patent application 2009/0263707 to Buckley et al, entitled "High Energy Lithium Ion Secondary Batteries", incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof Traditionally, the electrolyte comprises a 1 M concentration of the lithium salts.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme(diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992 filed on Dec. 4, 2009 to Amiruddin et al., entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them and configured to form a desired battery structure. Appropriate electrically conductive tabs can be welded or the like to the current collectors, and the resulting electrode structure can be placed into a metal canister or polymer package, with the negative tab and positive tab welded to appropriate external contacts. Electrolyte is added to the canister, and the canister is sealed to complete the battery. Desirable pouch battery designs are described further in copending U.S. provisional patent application 61/369,825 to Kumar et al., entitled "Battery Packs for Vehicles and High Capacity Pouch Secondary Batteries for Incorporation Into Compact Battery Packs," incorporated herein by reference.

EXAMPLES

Example 1

Synthesis of the Lithium Doped Complex Metal Oxides

This example demonstrates the formation of a desired positive electrode active material using a carbonate or hydroxide co-precipitation process. Stoichiometric amounts of transition metal precursors were dissolved in distilled water to form an aqueous solution with the metal salts in the desired molar ratios. Separately, an aqueous solution containing $Na_2CO_3$ and/or $NH_4OH$ was prepared. For the formation of the precursor powder samples, one or both solutions were gradually added to a reaction vessel to form metal carbonate or metal hydroxide precipitates. The reaction mixture was stirred, and the temperature of the reaction mixture was kept between room temperature and 80° C. The pH of the reaction mixture was in the range from 6-12. In general, the aqueous metal solution had a concentration from 1M to 3M, and the aqueous $Na_2CO_3/NH_4OH$ solution had a $Na_2CO_3$ concentration of 1M to 4M and/or a $NH_4OH$ concentration of 0.2-2M. The metal carbonate or hydroxide precipitate was filtered, washed multiple times with distilled water, and dried at 110° C. for about 16 hrs to form a metal carbonate or metal hydroxide powder. Specific ranges of reaction conditions for the preparation of the precursor powder samples are further outlined in Table 1, where the solution may not include both $Na_2CO_3$ and $NH_4OH$.

TABLE 1

| Reaction Process Condition | Values |
| --- | --- |
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ | 1-4M |
| Concentration of $NH_4OH$ | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate or metal hydroxide powder and thoroughly mixed with a Jar Mill, double planetary mixer, or dry powder rotary mixer to form a homogenous powder mixture. A portion, e.g. 5 grams, of the homogenized powders was calcined in a step to form the oxide (metal oxide formation), followed by an additional mixing step to further homogenize the powder. The further homogenized powder was again calcined to form the highly crystalline lithium composite oxide (crystallization). Specific ranges of calcination conditions are further outlined in Table 2 (scfh is a standard cubic foot per hour). The product composition was determined to be $Li_{1.21}Ni_{0.175}Co_{0.1}Mn_{0.525}O_2$. We refer to this composition as the baseline composition. Specific ranges of calcinations conditions are further outlined in Table 2.

TABLE 2

| | Calcination Process Condition | Values |
| --- | --- | --- |
| $1^{st}$ Step | Temperature | 400-800° |
| | Time | 1-24 hr |
| | Protective gas | Nitrogen or Air |
| | Flow rate of protective gas | 0-50 scfh |
| $2^{nd}$ Step | Temperature | 700-1100° |
| | Time | 1-36 hr |
| | Protective gas | Nitrogen or Air |
| | Flow rate of protective gas | 0-50 scfh |
| $3^{rd}$ Step | Temperature | 600-1000° |
| | Time | 1-24 hr |
| | Protective Gas | Nitrogen or Air |
| | Flow rate of protective gas | 0-50 scfh |

Lithium doped electrode active material were also formed using the method the described above based on the addition of dopant lithium at an appropriate step in the process. Specifically, dopant lithium was added either during the initial co-precipitation process or in a subsequent solid state reaction. Where doping was incorporated into the initial co-precipitation process, a desired amount of soluble lithium salt was added to the aqueous solution of metal salts prior to co-precipitation. Where doping was done subsequent to co-precipitation, doped electrode active material was formed with two alternative ways to introduce the dopant lithium. In one post co-precipitation doping method, an appropriate amount of $Li_2CO_3$ was added to the metal oxide powders during mixing prior to the second higher temperature calcination step in which the crystallinity of the material was improved. In an alternative post co-precipitation doping method, an appropriate amount of $Li_2CO_3$ was mixed with the crystallized metal oxide powder formed during the second calcination step. The mixture was then heated in a third calcination step. Specific ranges for this third calcination step are outlined in Table. 2. Notwithstanding the doping method used, the target product composition was $Li_{1.2}Ni_{0.175}Co_{0.1}Mn_{0.575-\epsilon}Li_\epsilon O_2$, with $0<\epsilon \leqq 0.1$ ($\epsilon=0$ corresponds to the baseline composition). Battery performance is presented below with values of $\epsilon$ of 0.005, 0.01, 0.02, 0.05, 0.075 and 0.1. We refer to such compositions as doped compositions.

Example 2

Batter Performance—Lithium Foil Negative Electrode; Lithium Dosed Positive Electrode (Co-Precipitation)

This example demonstrates the battery performance of coin cells formed from positive electrodes comprising lithium metal oxides with and without lithium doping. Doping was done during co-precipitation as described in Example 1 above.

Coin cell batteries were formed with positive electrodes incorporating both doped and un-doped lithium metal oxide (LMO) powders synthesized as described in Example 1. The LMO powders were mixed thoroughly with acetylene black (Super P™ from Timcal, Ltd, Switzerland) and graphite (KS 6™ from Timcal, Ltd) to form a homogeneous powder mixture. Separately, polyvinylidene fluoride PVDF (KF1300™ from Kureha Corp., Japan) was mixed with N-methyl-pyrrolidone (Honeywell—Riedel-de-Haen) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. The mixture comprised at least about 75 weight percent active metal oxide, at least about 3 weight percent acetylene black, at least about 1 weight percent graphite, and at least about 2 weight percent polymer binder.

The positive electrode was placed inside an argon filled glove box for the fabrication of the coin cell batteries. Lithium foil (FMC Lithium) having thickness of roughly 125 micron was used as a negative electrode. The electrolyte was selected to be stable at high voltages, and appropriate electrolytes are described in copending U.S. patent application Ser. No. 12/630,992 to Amiruddin et al., entitled "Lithium Ion Battery With High Voltage Electrolytes and Additives," incorporated herein by reference. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Figure 2:
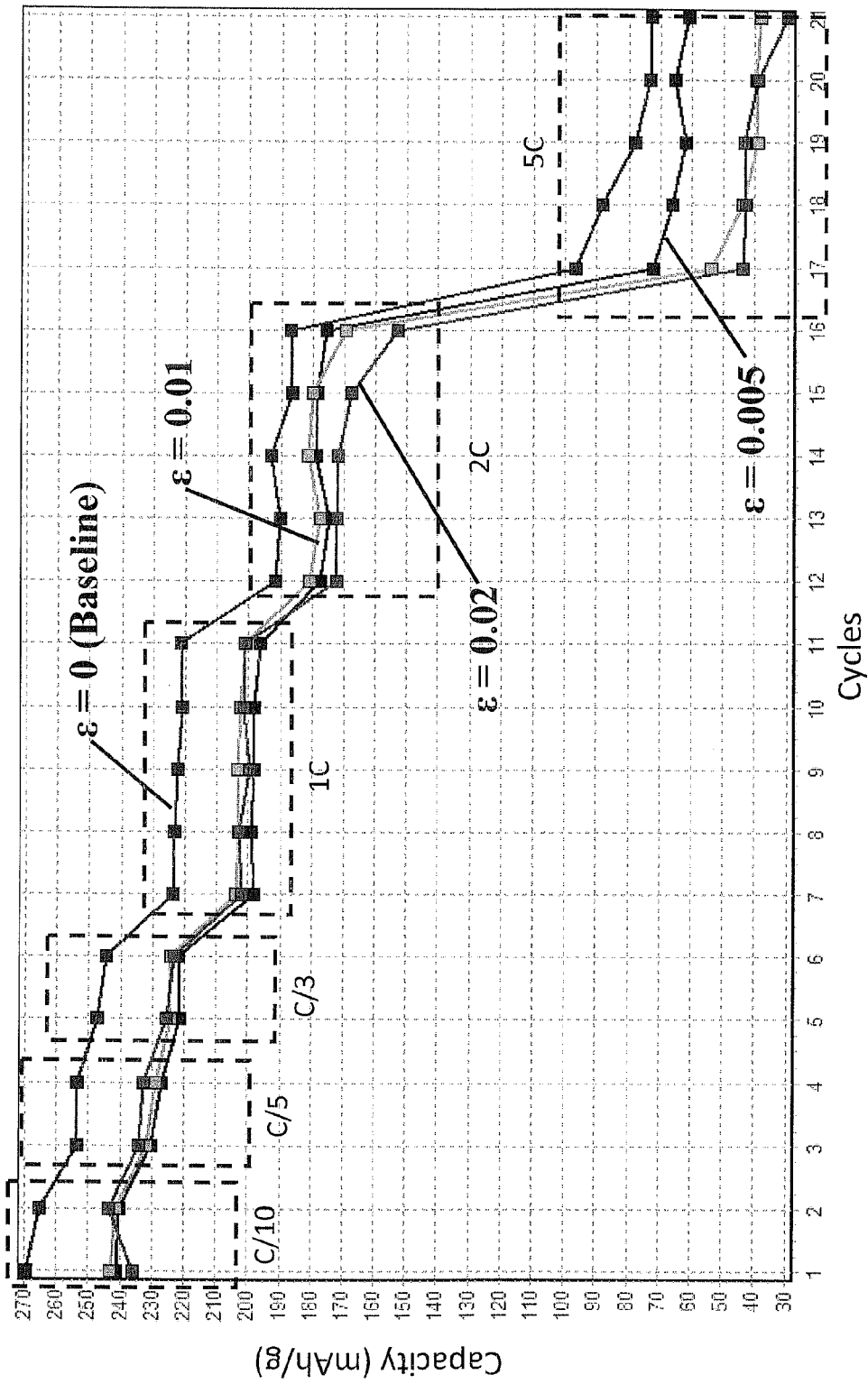
FIG. 2 is a graph with plots of specific discharge capacity versus cycle life for lithium coin cell batteries formed with positive electrode active materials having several different lithium dopant levels with cycling performed at several different discharge rates.
Figure 3:
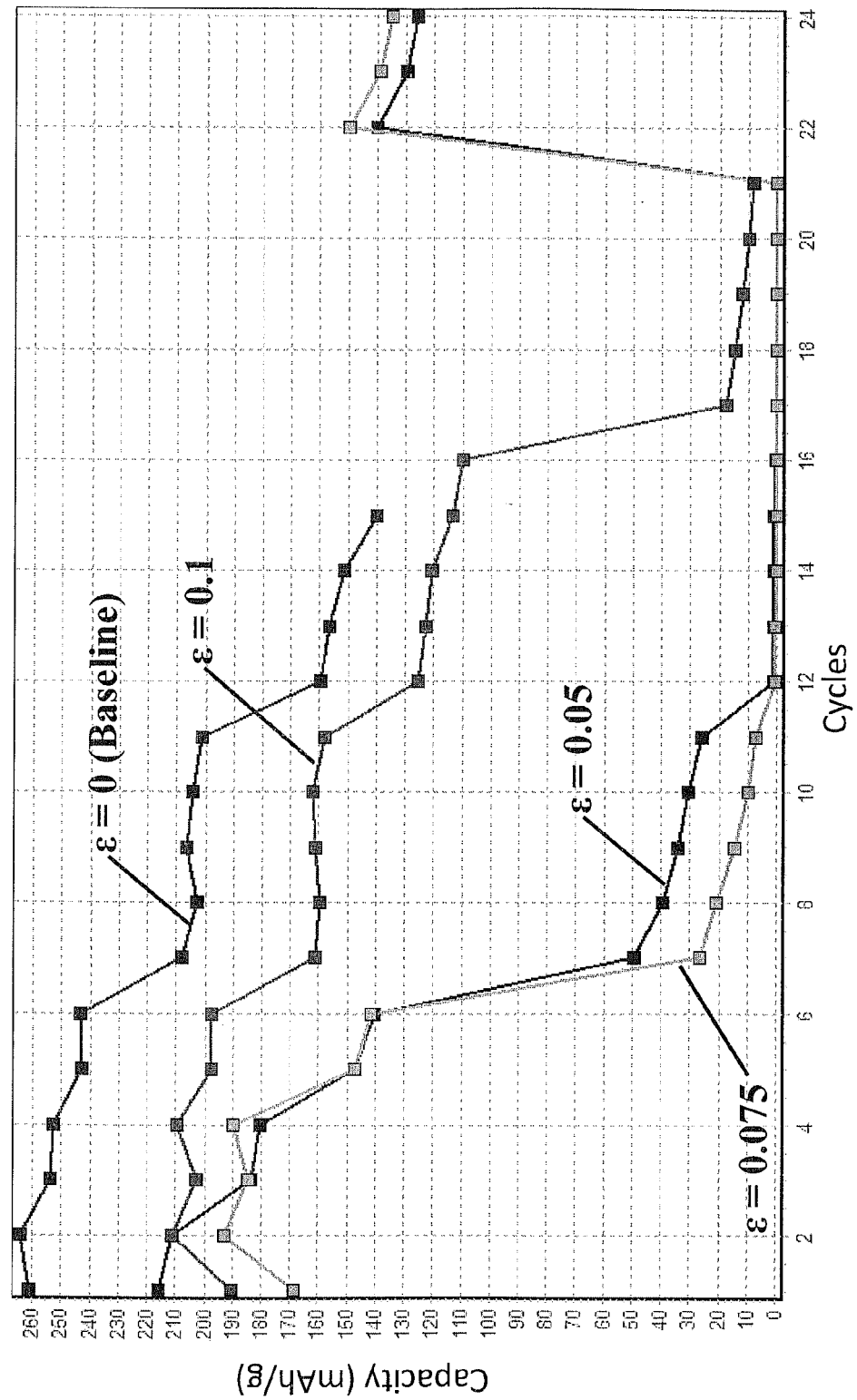
FIG. 3 is a graph with plots of specific discharge capacity versus cycle life for various batteries formed with positive electrode active materials having several different lithium dopant levels greater than the dopant levels in the batteries providing the results plotted in FIG. 2 with cycling performed at several different discharge rates.

Coin cells were formed with 6 different dopant levels with the dopant lithium added during the co-precipitation. The resulting coin cell batteries were tested for 21 or 24 charge and discharge cycles at discharge rates of C/10 for cycles 1-2, C/5 for cycles 3-4, C/3 for cycles 5-6, 1 C for cycles 7-11, 2 C for cycles 12-16, 5 C for cycles 17-21, and 0.5 C for cycles 22-24, when applicable. During each charge cycle, a battery was charged to 4.6V and discharged to 2.0V. Plots of specific discharge capacity versus cycle of the coin cell batteries are shown in FIGS. 2-3. Specifically, graphs shown in FIG. 2 are directed to batteries formed from positive electrode active materials described in Example 1 with approximate stoichiometries represented by $\epsilon=0$, 0.005, 0.01, and 0.02. Graphs shown in FIG. 3 are directed to batteries formed from positive electrode active materials described in Example 1 with approximate stoichiometries represented by $\epsilon=0, 0.05, 0.075$, and 0.1. The $\epsilon=0$ baseline results are shown in both FIGS. 2 and 3 to provide reference values. In general, the specific capacity of the doped active materials in these batteries was reasonably high for most of the samples at all rates, although the specific capacities were less than the baseline specific capacities for all of these samples. At higher rates, the specific capacities for the samples with $\epsilon=0.05$ and 0.075 yielded lower values of specific capacity than samples with lesser or greater amounts of dopant.

Example 3

Battery Performance—Graphite Negative Electrode; Lithium Doped Positive Electrode (Co-Precipitation)

This example demonstrates the battery performance of coin cells formed from positive electrodes comprising lithium metal oxides with and without lithium doping. Doping was done during co-precipitation as described in Example 1 above. Coin cell batteries were formed as described in Example 2 with graphite as an active material substituted for lithium foil in the negative electrode. Specifically, a blend of graphite, optional conductive carbon and binder was used as the negative electrode to have from about 80-99 weight percent graphite. The negative electrode composition was coated onto a copper foil current collector and dried.

Figure 4:
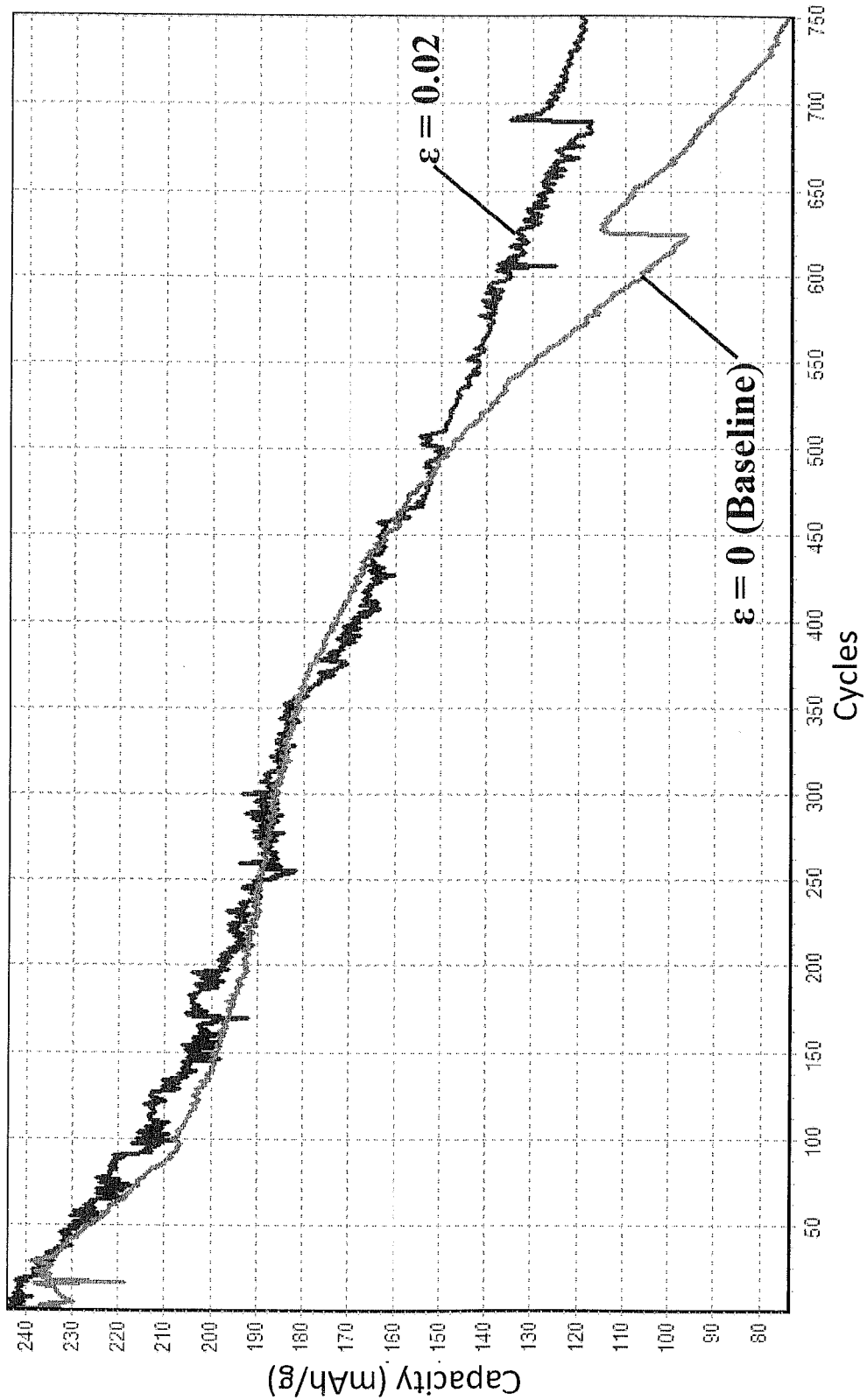
FIG. 4 is a graph with plots of specific discharge capacity versus cycle life for lithium ion coin cell batteries with graphite active material in the negative electrode and lithium doped positive electrode active material, showing variation of the discharge capacities as a function of cycle number up to 750 cycles at a C/3 discharge rate.

The coin cell batteries were tested for 750 charge and discharge cycles at discharge rates of C/10 for cycles 1-2 and at C/3 for cycles 2-750. During each charge cycle, a battery was charged to 4.5V and discharged to 2.0V. Plots of specific discharge capacity versus cycle of the coin cell batteries are shown in FIG. 4. Specifically, graphs shown in FIG. 4 are directed to batteries formed from positive electrode active materials described in Example 1 with approximate stoichiometries represented by $\epsilon=0$ and 0.02. The battery formed from the doped composition shows significantly improved specific capacity at cycles roughly above cycle 500 relative to the battery formed from the baseline, i.e., undoped, composition. Spikes observed in the specific capacity data at about 620 cycle for the undoped material and at about 690 cycle for the doped material were due to inadvertent temperature changes in the testing facility that when corrected resulted in the spike, and these temperature fluctuations and return to room temperature should not alter the qualitative results and conclusions.

Example 4

Battery Performance—Lithium Foil Negative Electrode; Lithium Doped Positive Electrode (Post Co-Precipitation)

This example demonstrates the battery performance of coin cells formed from positive electrodes comprising lithium metal oxides with and without lithium doping. Doping was done subsequent to co-precipitation and heating to form the metal oxide, as described in Example 1 above. Coin cell batteries were formed as described in Example 2.

One set of battery samples were formed from positive electrode active materials in which the dopant lithium with $\epsilon=0.02$ or 0.05 was introduced in a second heating step at 900° C. to improve the crystallinity of the complex metal oxide. Other sets of battery samples were formed with positive electrode active materials in which the dopant lithium with $\epsilon=0.02$ or 0.05 was added in a third heating step after a calcination step to improve the overall crystallinity of the active material. The third heating step was performed alternatively at 600° C., 700° C. or 800° C. The coin cell batteries were tested for 21 charge and discharge cycles at discharge rates of C/10 for cycles 1-2, C/5 for cycles 3-4, C/3 for cycles 5-6, 1 C for cycles 7-11, 2 C for cycles 12-16, and 5 C for cycles 17-21. During each charge cycle, a battery was charged to 4.6V and discharged to 2.0V.

Figure 5:
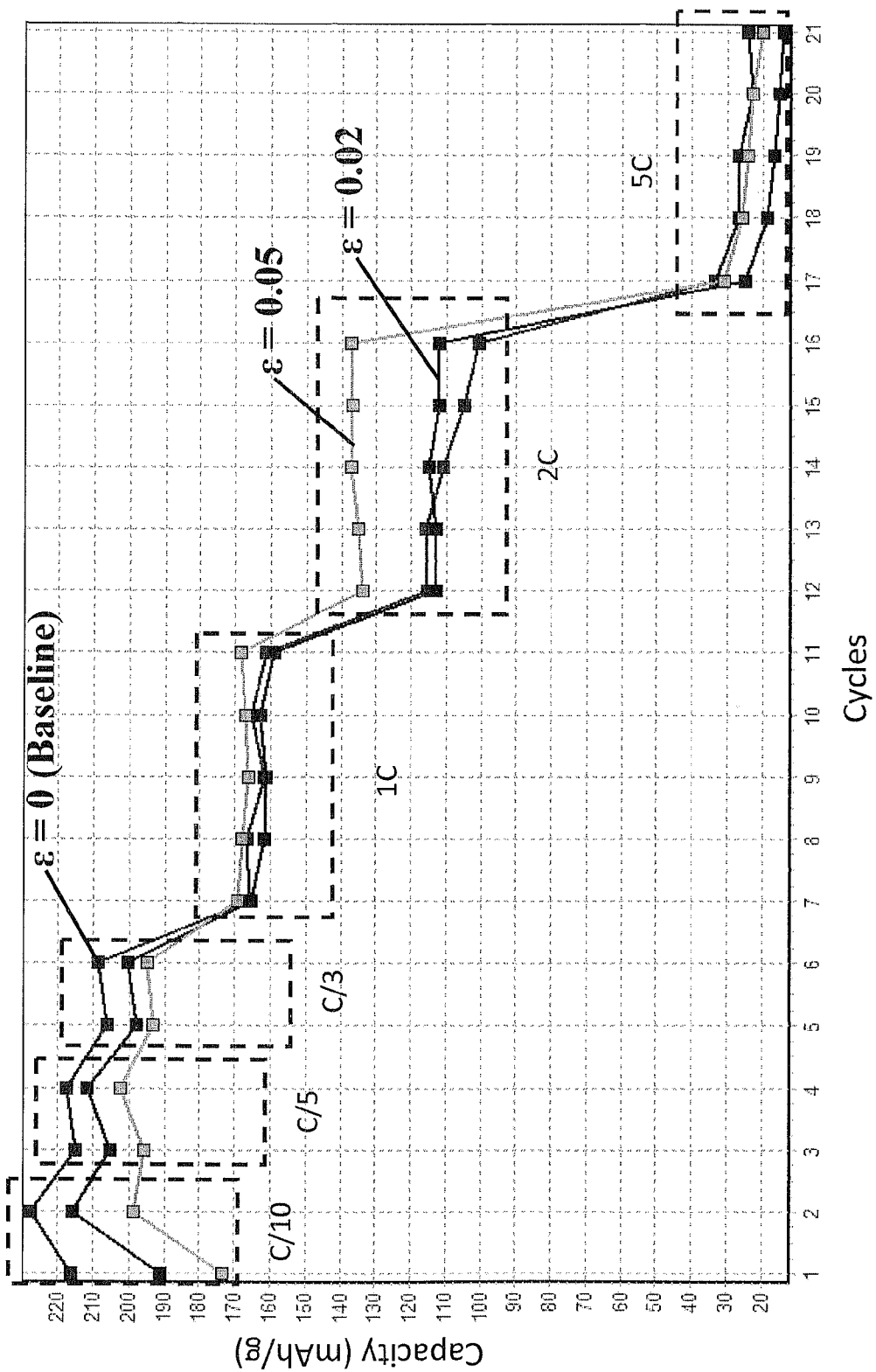
FIG. 5 is a graph with plots of specific discharge capacity versus cycle life for lithium coin cell batteries with positive electrode active material with a lithium dopant introduced during crystallization at 900° C., showing variation of the discharge capacities as a function of cycle number at several different discharge rates.
Figure 6:
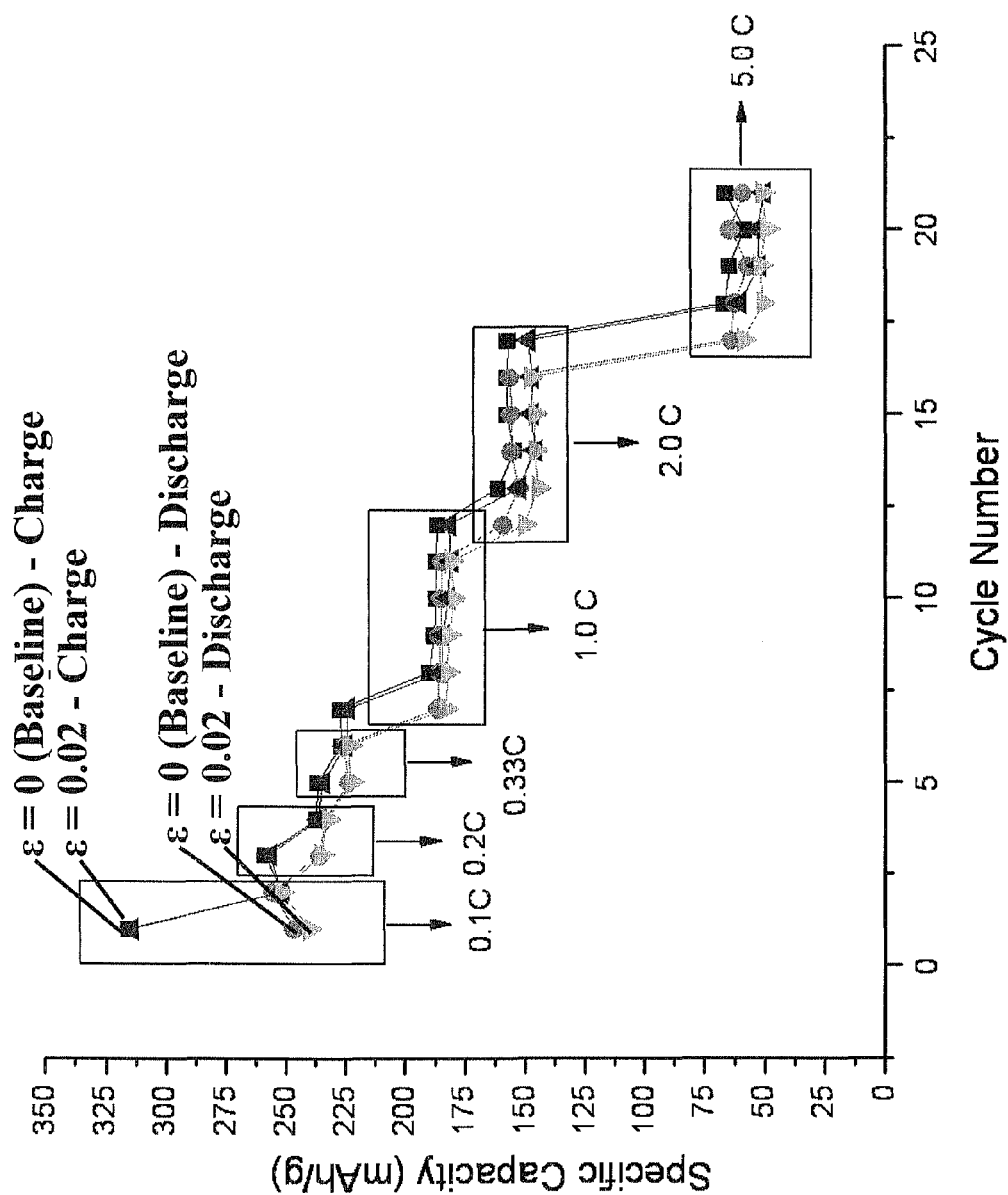
FIG. 6 is a graph with plots of specific capacities versus cycle life for lithium coin cell batteries with positive electrode active material synthesized using post-crystallization doping at 600° C., showing variation of the charge and discharge capacities as a function of cycle number at several different discharge rates.
Figure 7:
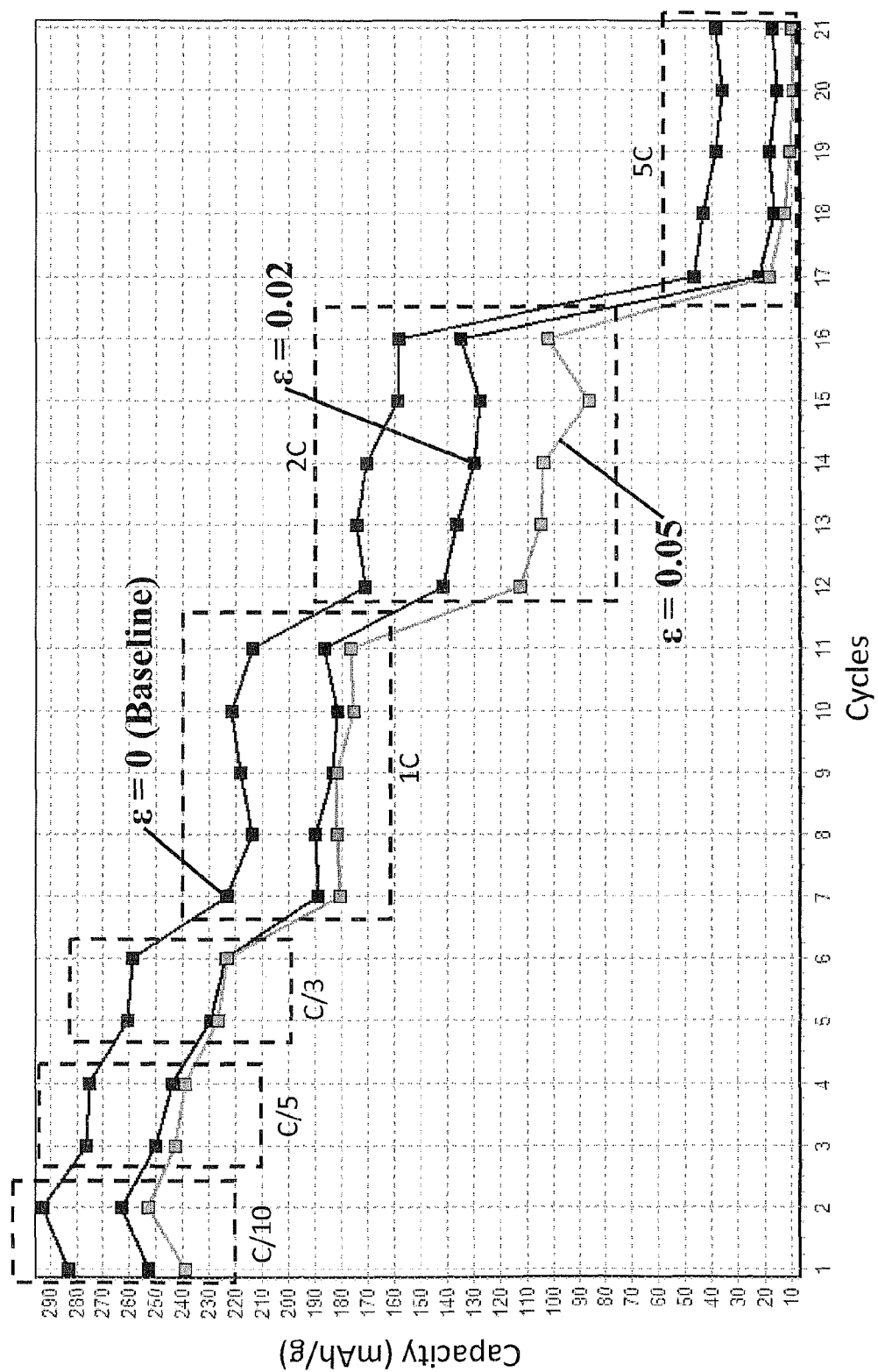
FIG. 7 is a graph with plots of specific discharge capacities versus cycle life for lithium coin cell batteries with positive electrode active material synthesized using post-crystallization doping at 700° C., showing variation of the discharge capacities as a function of cycle number at several different discharge rates.
Figure 8:
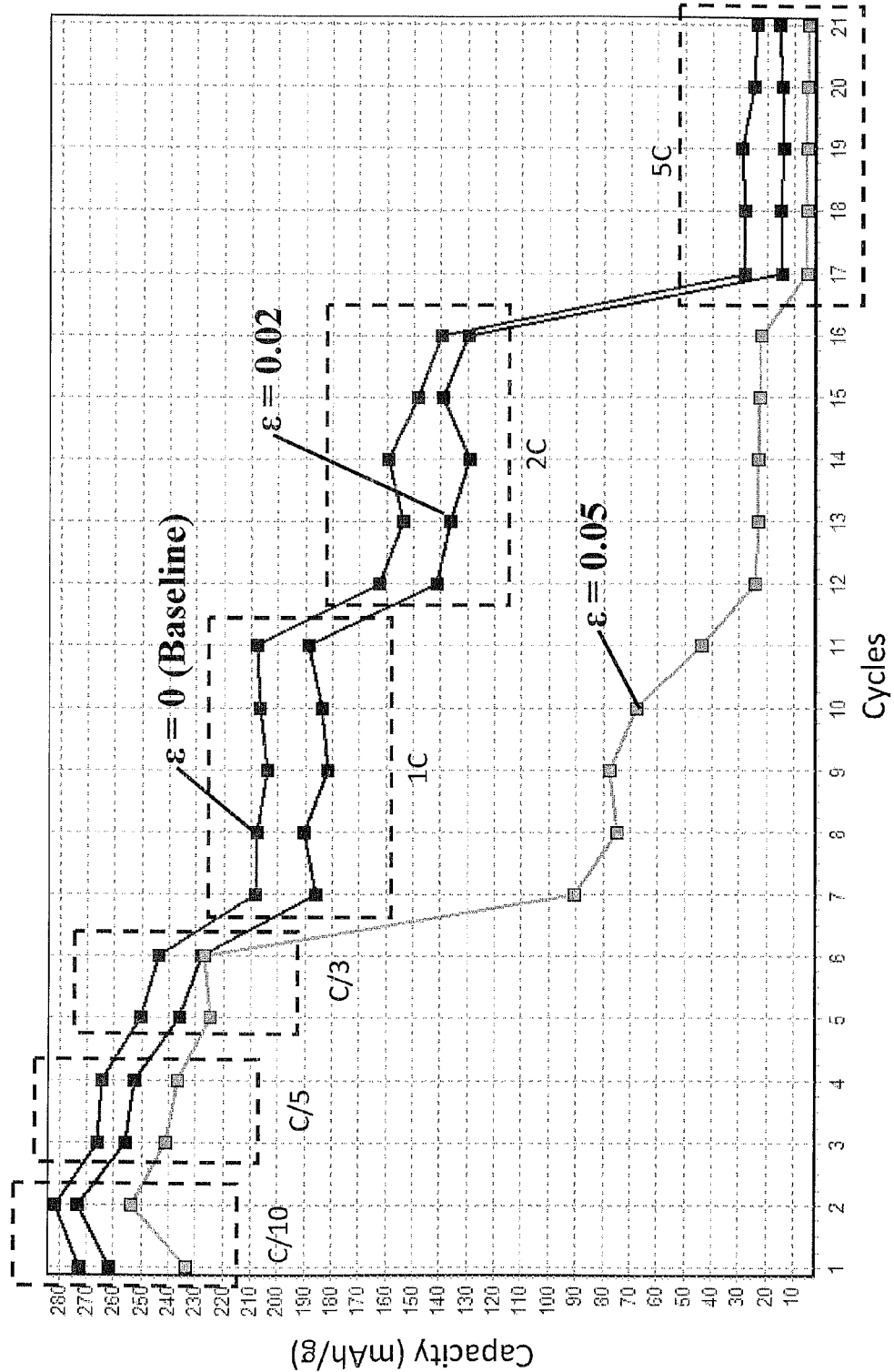
FIG. 8 is a graph with plots of specific discharge capacities versus cycle life for lithium coin cell batteries with positive electrode active material synthesized using post-crystallization doping at 800° C., showing variation of the discharge capacities as a function of cycle number at several different discharge rates.

Plots of specific discharge capacity versus cycle of the coin cell batteries are shown in FIGS. 5-8. Graphs shown in FIG. 5 display battery compositions formed from doped positive electrode active materials wherein doping was performed during crystallization at 900° C. The batteries with lithium dopant introduced during the crystalization process exhibited improved high rate discharge specific capacities at $\epsilon=0.05$. Graphs shown in FIGS. 6-8 are directed to battery compositions wherein the positive electrode active material was doped after crystallization at 600° C., 700° C. or 800° C., respectively. The graphs in FIG. 6 include both charge and discharge specific capacities, while only discharge specific capacities are plotted in FIGS. 7 and 8. Generally, the discharge capacities from batteries formed from doped compositions were similar to the discharge capacities from batteries formed from baseline compositions. Moreover, as seen in FIGS. 5-7, increasing the calcination temperature during doping has a significant adverse effect on the specific discharge capacity of batteries at discharge rates of 1 C and 2 C where $\epsilon=0.05$.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. As used herein, the notation (value1≦variable≦value2) implicitly assumes that value 1 and value 2 are approximate quantities.

What is claimed is:

1. A positive electrode active material for a lithium ion battery comprising a layered lithium doped lithium metal oxide composition approximately represented by a formula $xLi_2MnO_3 \cdot (1-x)LiNi_{u+\Delta}Mn_{u-\Delta-d}Li_dCo_wA_yO_2$, x ranges from about 0.03 to about 0.55, d ranges from about 0.004 to about 0.05, 2u+w+y is approximately equal to 1, $\Delta$ ranges from about −0.0019 to about 0.0019, w ranges from about 0.2 to about 0.475, u ranges from about 0.2 to about 0.4, y ranges from 0 to about 0.1 with the proviso that both (u+$\Delta$) and w are not both 0 and A is Mg, Sr, Ba, Cd, Zn, Al, Ga, B, Zr, Ti, Ca, Ce, Y, Nb, Cr, Fe, V, or combinations thereof.

2. The positive electrode active material of claim 1 wherein x ranges from about 0.075 to about 0.50.

3. The positive electrode active material of claim 1 wherein y is approximately equal to 0.

4. The positive electrode active material of claim 1 further comprising a metal fluoride coating.

5. The positive electrode active material of claim 1 further comprising a metal oxide coating.

6. A positive electrode for a lithium-based battery, the electrode comprising the positive electrode active material of claim 1, from about 1 weight percent to about 25 weight percent distinct electrically conductive powder and a polymer binder.

7. A lithium-based battery comprising a negative electrode, the positive electrode of claim 6, a separator between the positive electrode and the negative electrode and an electrolyte comprising lithium ions.

8. The lithium-based battery of claim 7 wherein the negative electrode comprises graphitic carbon active material.

* * * * *